US011987356B2

(12) United States Patent
Stahulak et al.

(10) Patent No.: US 11,987,356 B2
(45) Date of Patent: May 21, 2024

(54) DRONE-BASED CONFIRMATION OF LINE OF SIGHT BETWEEN TWO GEOSTATIONARY FIXED POINTS

(71) Applicant: AT&T Intellectual Property I, L.P., Atlanta, GA (US)

(72) Inventors: Charles Stahulak, Chicago, IL (US); Daniel Redmond, Elk Grove, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 200 days.

(21) Appl. No.: 17/453,099

(22) Filed: Nov. 1, 2021

(65) Prior Publication Data

US 2023/0134289 A1 May 4, 2023

(51) Int. Cl.
*B64C 39/02* (2023.01)
*B64U 10/13* (2023.01)
(Continued)

(52) U.S. Cl.
CPC ......... *B64C 39/024* (2013.01); *G05D 1/0094* (2013.01); *G05D 1/104* (2013.01);
(Continued)

(58) Field of Classification Search
CPC .. B64C 39/024; B64U 10/13; B64U 2101/30; B64U 2101/32; B64U 2201/10; B64U 2201/00; B64U 10/00; B64U 10/80; B64U 20/00; B64U 20/98; B64U 30/00; B64U 30/10; B64U 30/16; B64U 30/20; B64U 30/299; B64U 30/30; B64U 2101/31;
(Continued)

(56) References Cited

U.S. PATENT DOCUMENTS

2017/0013413 A1* 1/2017 Singh ................... G05D 1/0011
2022/0082495 A1* 3/2022 Kreitinger ............. G01N 21/39

FOREIGN PATENT DOCUMENTS

| EP | 2772725 A2 * | 9/2014 | ........... B64C 39/024 |
| GB | 2535162 A * | 8/2016 | ............. G01C 11/00 |
| GB | 2535162 A | 8/2016 | |

OTHER PUBLICATIONS

Bedini, Silvio; Oct. 31, 2004, "The Surveyors' Heliotrope: Its Rise and Demise"; The American Surveyor, https://amerisurv.com/2004/10/31/the-surveyors-heliotrope-its-rise-and-demise/ (Year: 2004).*

* cited by examiner

*Primary Examiner* — Christian Chace
*Assistant Examiner* — Nicholas Stryker (57) ABSTRACT

A method includes determining current coordinates and a current elevation setting of a first unmanned aerial vehicle that is to be deployed to a candidate location for a microwave radio dish, receiving expected coordinates and an expected elevation setting of a second unmanned aerial vehicle that is deployed to a location of an existing cellular base station, calculating an angle necessary to direct a flash of light from the first unmanned aerial vehicle toward the expected coordinates and expected elevation setting of the second unmanned aerial vehicle, adjusting a current angle of an optical system of the first unmanned aerial vehicle to match the angle that is calculated, and sending a dataset to a centralized computing device, wherein the dataset includes at least an elevation setting of the first unmanned aerial vehicle at a time of capture of an image of the flash by the second unmanned aerial vehicle.

20 Claims, 6 Drawing Sheets

(51) Int. Cl.
*B64U 101/30* (2023.01)
*B64U 101/32* (2023.01)
*G05D 1/00* (2006.01)
*G05D 1/10* (2006.01)

(52) U.S. Cl.
CPC .......... *B64U 10/13* (2023.01); *B64U 2101/30* (2023.01); *B64U 2101/32* (2023.01); *B64U 2201/10* (2023.01)

(58) Field of Classification Search
CPC ........ B64U 30/40; B64U 40/00; B64U 40/20; B64U 50/00; B64U 50/39; B64U 60/00; B64U 60/70; B64U 70/00; B64U 70/99; B64U 80/00; B64U 80/86; B64U 10/14; B64U 10/16; B64U 2101/00; G05D 1/0094; G05D 1/104; H04B 1/00
See application file for complete search history.

DRONE-BASED CONFIRMATION OF LINE OF SIGHT BETWEEN TWO GEOSTATIONARY FIXED POINTS

The present disclosure relates generally to mobile communications, and relates more particularly to devices, non-transitory computer-readable media, and methods for drone-based confirmation of line of sight between two geostationary fixed points.

BACKGROUND

A cellular communications network comprises a network of cellular phones which communicate with the telephone network by radio waves through a local antenna at a cellular base station. A cellular base station (or "base transceiver station" in global system for mobile communications (GSM) networks) is a cellular-enabled mobile device site (e.g., a radio mast, a tower, or another raised structure) on which antennas and electronic communications equipment are mounted to create a cell (i.e., a coverage area in which service is provided) in the cellular communications network. Typically, a cellular base station is connected to the service provider's mobile telephone switching offices (MTSOs), data centers, and central offices (which are connected between other central offices and customers in a hub-and-spoke configuration) via optical fibers. Telecommunications services, including cellular communications services from the cellular base stations, are provided to customers through these central offices. Microwave signals may be used to carry various services including data science and software services (DS3), Ethernet, and other services, and may also be used for cellular base station backhaul.

SUMMARY

The present disclosure broadly discloses methods, computer-readable media, and systems for drone-based confirmation of line of sight between two geostationary fixed points. In one example, a method performed by a processing system of a first unmanned aerial vehicle including at least one processor includes determining current coordinates and a current elevation setting of the first unmanned aerial vehicle, where the first unmanned aerial vehicle is to be deployed to a candidate location for a microwave radio dish, receiving expected coordinates and an expected elevation setting of a second unmanned aerial vehicle that is deployed to a location of an existing cellular base station, calculating an angle necessary to direct a flash of light from the first unmanned aerial vehicle toward the expected coordinates and expected elevation setting of the second unmanned aerial vehicle, adjusting a current angle of an optical system of the first unmanned aerial vehicle to match the angle that is calculated, and sending a dataset to a centralized computing device, wherein the dataset includes at least an elevation setting of the first unmanned aerial vehicle at a time of capture of an image of the flash by the second unmanned aerial vehicle.

In another example, a non-transitory computer-readable medium may store instructions which, when executed by a processing system of a first unmanned aerial vehicle including at least one processor, cause the processing system to perform operations. The operations may include determining current coordinates and a current elevation setting of the first unmanned aerial vehicle, where the first unmanned aerial vehicle is to be deployed to a candidate location for a microwave radio dish, receiving expected coordinates and an expected elevation setting of a second unmanned aerial vehicle that is deployed to a location of an existing cellular base station, calculating an angle necessary to direct a flash of light from the first unmanned aerial vehicle toward the expected coordinates and expected elevation setting of the second unmanned aerial vehicle, adjusting a current angle of an optical system of the first unmanned aerial vehicle to match the angle that is calculated, and sending a dataset to a centralized computing device, wherein the dataset includes at least an elevation setting of the first unmanned aerial vehicle at a time of capture of an image of the flash by the second unmanned aerial vehicle.

In another example, a first unmanned aerial vehicle may include a processing system including at least one processor and a non-transitory computer-readable medium storing instructions which, when executed by the processing system, cause the processing system to perform operations. The operations may include determining current coordinates and a current elevation setting of the first unmanned aerial vehicle, where the first unmanned aerial vehicle is to be deployed to a candidate location for a microwave radio dish, receiving expected coordinates and an expected elevation setting of a second unmanned aerial vehicle that is deployed to a location of an existing cellular base station, calculating an angle necessary to direct a flash of light from the first unmanned aerial vehicle toward the expected coordinates and expected elevation setting of the second unmanned aerial vehicle, adjusting a current angle of an optical system of the first unmanned aerial vehicle to match the angle that is calculated, and sending a dataset to a centralized computing device, wherein the dataset includes at least an elevation setting of the first unmanned aerial vehicle at a time of capture of an image of the flash by the second unmanned aerial vehicle.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for drone-based confirmation of line of sight between two geostationary fixed points. As discussed above, a cellular base station is typically connected to a cellular communications service provider's mobile telephone switching offices (MTSOs), data centers, and central offices via optical fibers. However, in some areas such as rural and/or mountainous areas, running optical fiber may not be cost effective. Thus, to increase coverage in an area where the deployment of optical fiber is not feasible, the cellular communications service provider may instead rely on microwave radio to act like fiber. In this case, the equipment typically supported by a cellular base station is instead connected to a microwave radio dish which is positioned between two cellular base stations.

In order to provide the greatest quality reception to mobile devices within a cell served by a microwave radio dish, the microwave radio dish should have relatively clear lines of sight (i.e., unobstructed by objects that can interfere with or block microwave signals, such as trees, buildings, and the like) to the cellular base stations between which the microwave radio dish is positioned. Typically, when a microwave radio dish is to be deployed in this manner, the cellular communications service provider will use a software application to determine a height at which to position the microwave radio dish for a clear line of sight. However, the software application may not always provide the most accurate information due to changes in the topography in the area where the microwave radio dish is to be deployed. Thus, the service provider may perform a survey to confirm line of sight for the proposed location of the microwave radio dish. The service provider may also perform a mapping survey to estimate the resultant coverage area for the cellular communications network assuming that the microwave radio dish is deployed in the proposed location.

Line of sight surveys typically involve sending a first technician out to a first location (e.g., a proposed location for a microwave radio dish) and a second technician out to a second location (e.g., a location of an existing cellular base station). If the infrastructure at either location is not climbable, then a mechanical lift may also be needed to help the technician get into position. All of these factors can increase the cost of the survey to varying degrees. On average, a line of sight survey will cost between $5,700 and $7,000 USD. Drive surveys that do not require climbing are typically less costly, but are also less reliable due to the greater possibility of missing or miscalculating obstructions. In other cases, the service provider may simply plot elevation rises in a path model and clear these elevation rises as "hot spots;" however, unassuming low spots containing tall buildings or other structures which may obstruct signals may be missed by this approach. Coverage mapping can add one thousand dollars or more in costs, for an average total cost of approximately $9,000 USD (including line of sight survey and coverage mapping).

Examples of the present disclosure utilize unmanned aerial vehicles (also referred to as "UAVs") such as drones to perform surveys and coverage mapping of candidate sites for microwave radio dish deployment. In one example, a first unmanned aerial vehicle is deployed to a candidate site, while a second unmanned aerial vehicle is deployed to a location of an existing cellular base station. In this example, both the first unmanned aerial vehicle and the second unmanned aerial vehicle function as fixed geospatial points. The first unmanned aerial vehicle then controls an integrated optical system to create a flash of light that can be detected by the second unmanned aerial vehicle. The integrated optical system may comprise an integrated mirror to reflect light from the sun towards the second unmanned aerial vehicle, or may comprise a laser light source that can be used to emit a pulse of light. The flash of light triggers image capture by the second unmanned aerial vehicle. These images may be transmitted to a centralized location (e.g., a server or other computing devices) for review by a human analyst. Thus, the pair of unmanned aerial vehicles function as a set of fixed, geostationary points. The entire survey and mapping process may be performed in this manner for lower cost than typical line of sight surveys (e.g., for approximately $4,000 USD or less on average).

Hundreds (if not more) line of sight surveys are performed in the United States each week. Thus, examples of the present disclosure provide the possibility to reduce costs significantly. For instance, if one hundred line of sight surveys are performed per week, and twenty percent of those surveys are performed using the disclosed methods, $100,000 USD or more per week could be saved, without loss of accuracy. On a global scale, the cost savings could potentially equal millions of dollars per week. These and other aspects of the present disclosure are discussed in greater detail below in connection with the examples of FIGS. 1-6.

Figure 1:
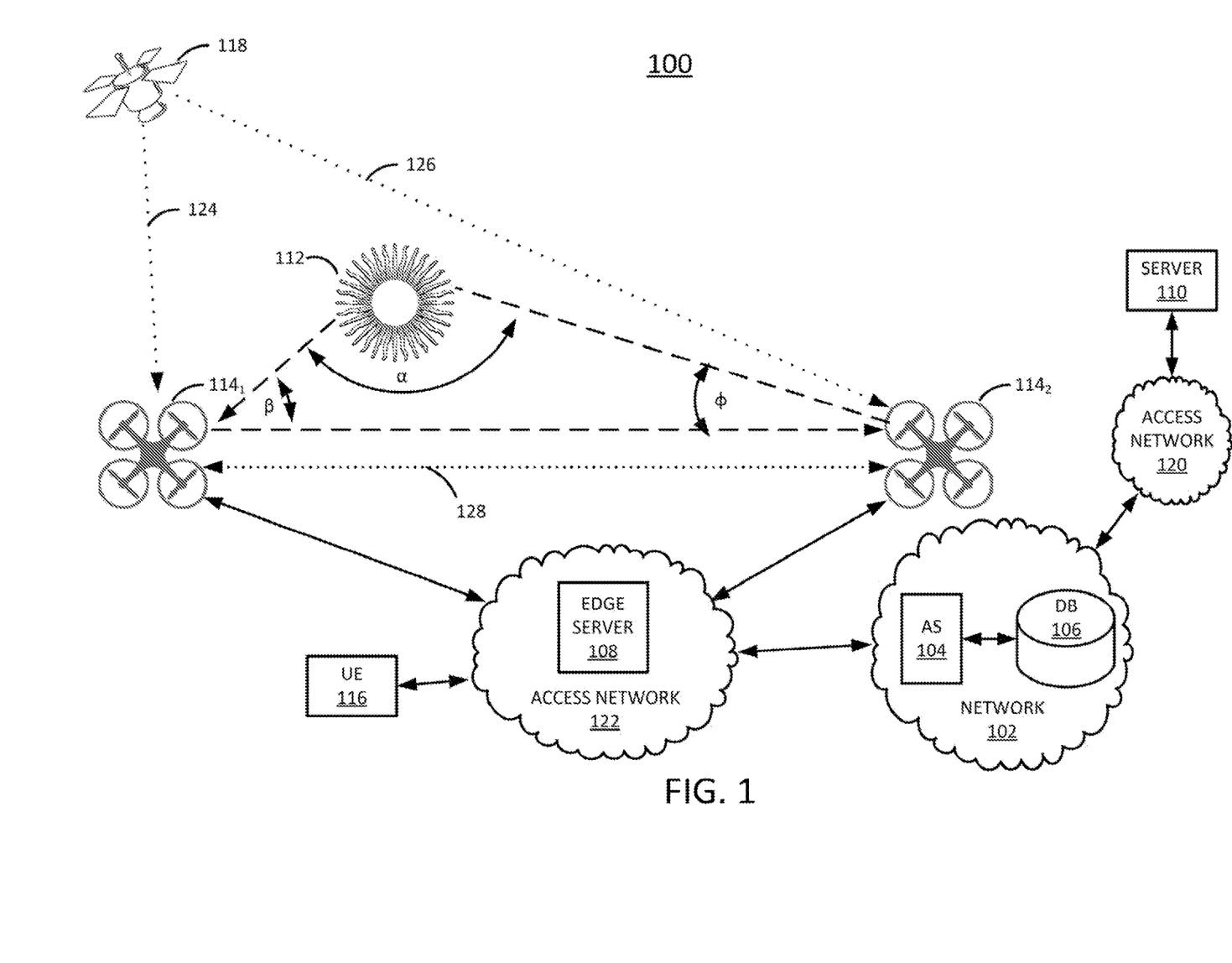
FIG. 1 illustrates an example system in which examples of the present disclosure may operate.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, $3^{rd}$ party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and other may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 6:
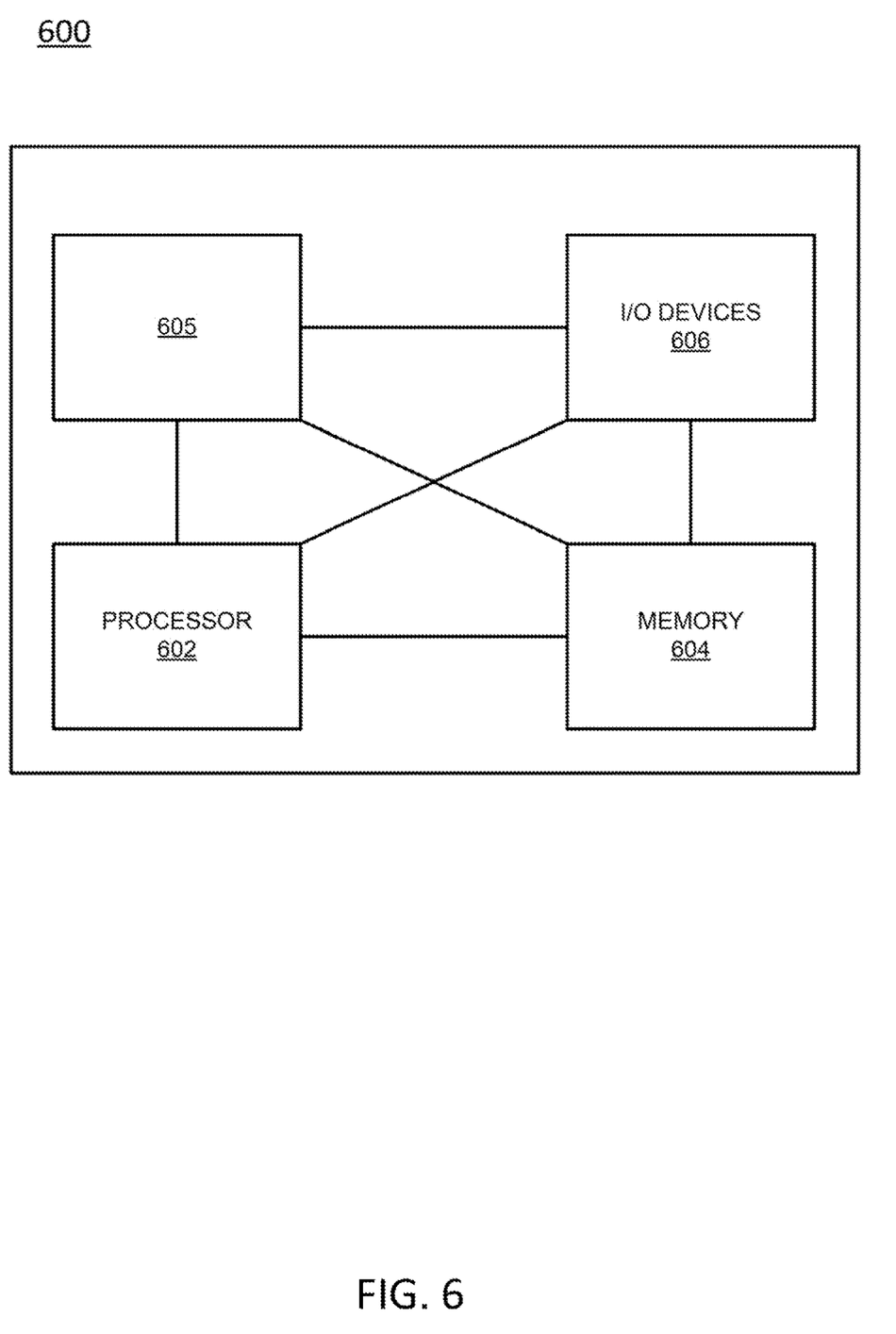
FIG. 6 illustrates an example of a computing device, or computing system, specifically programmed to perform the steps, functions, blocks, and/or operations described herein.

In accordance with the present disclosure, network 102 may include an application server (AS) 104, which may comprise a computing system or server, such as computing system 600 depicted in FIG. 6, and may be configured to provide one or more operations or functions in connection with examples of the present disclosure for drone-based confirmation of line of sight between two geostationary fixed points. The network 102 may also include a database (DB) 106 that is communicatively coupled to the AS 104.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 6 and discussed below) or multiple computing devices collectively configured to perform various steps, functions, and/or operations in accordance with the present disclosure. Thus, although only a single application server (AS) 104 and a single database (DB) are illustrated, it should be noted that any number of servers may be deployed, and which may operate in a distributed and/or coordinated manner as a processing system to perform operations in connection with the present disclosure.

In one example, AS 104 may comprise a centralized network-based server for coordinating a plurality of unmanned aerial vehicles $114_1$-$114_2$ (hereinafter individually referred to as an "unmanned aerial vehicle 114" or collectively referred to as "unmanned aerial vehicles 114") to perform a line of sight survey. For instance, the AS 104 may host an application that determines coordinates for a candidate location, transmits the coordinates to one or more of the unmanned aerial vehicles 114, receives data including images and coordinates from the unmanned aerial vehicles 114, and evaluates one or more candidate locations for possible deployment of a microwave radio dish based on the received data.

In one example, AS 104 may comprise a physical storage device (e.g., a database server), to store candidate locations for deployment of a microwave radio dish. For instance, the AS 104 may store an index, where the index maps each candidate location of a plurality of candidate locations to a set of coordinates (e.g., latitude and longitude or other coordinates), to images of the locations that were captured by the unmanned aerial vehicles 114, and/or to other data. The candidate locations may be provided by a service provider who is deploying the microwave radio dish.

In one example, the DB 106 may store the index, and the AS 104 may retrieve the index from the DB 106 when needed. For ease of illustration, various additional elements of network 102 are omitted from FIG. 1.

Figure 3:
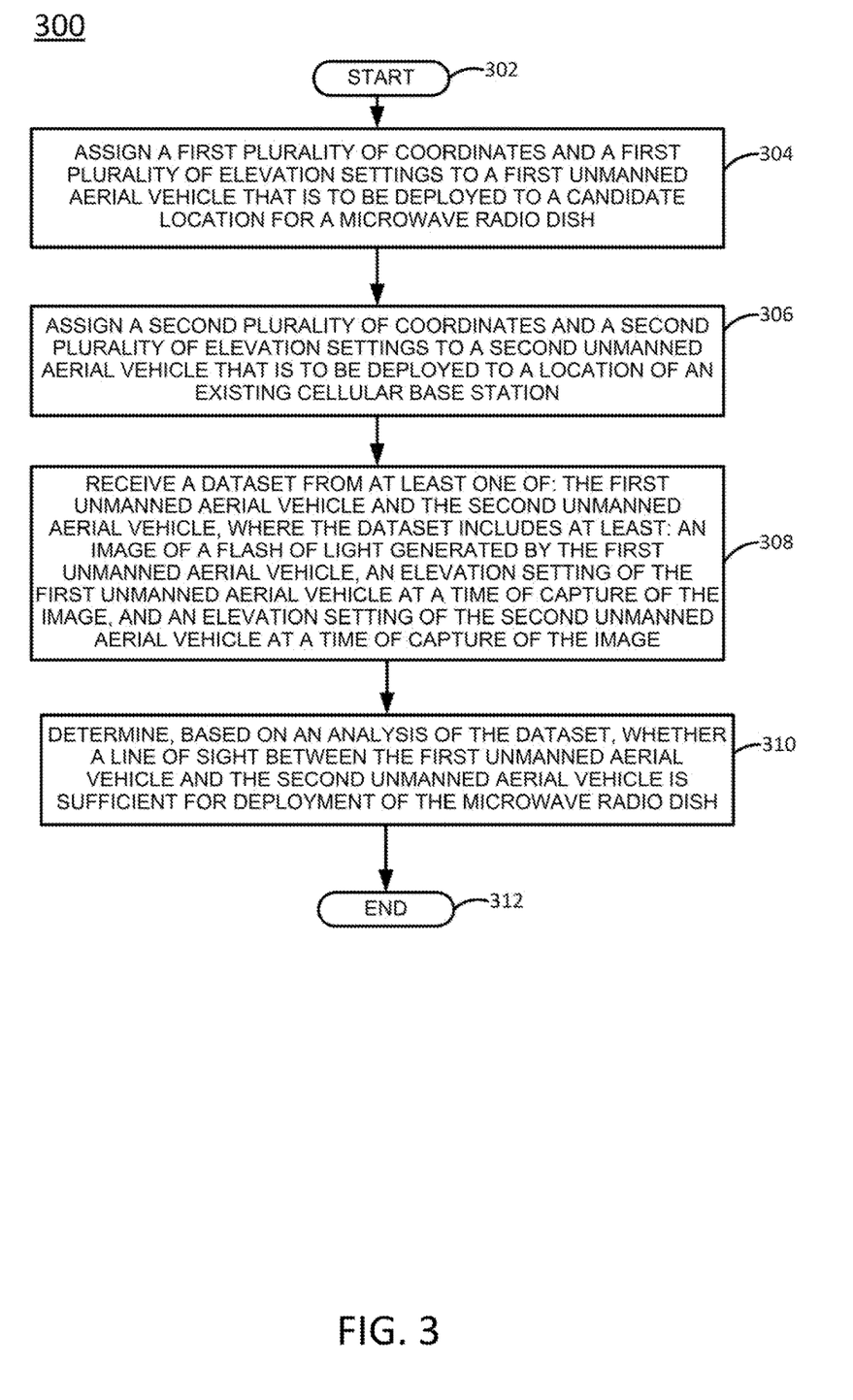
FIG. 3 illustrates a flowchart of an example method for drone-based confirmation of line of sight between two geostationary fixed points, in accordance with the present disclosure.
Figure 4:
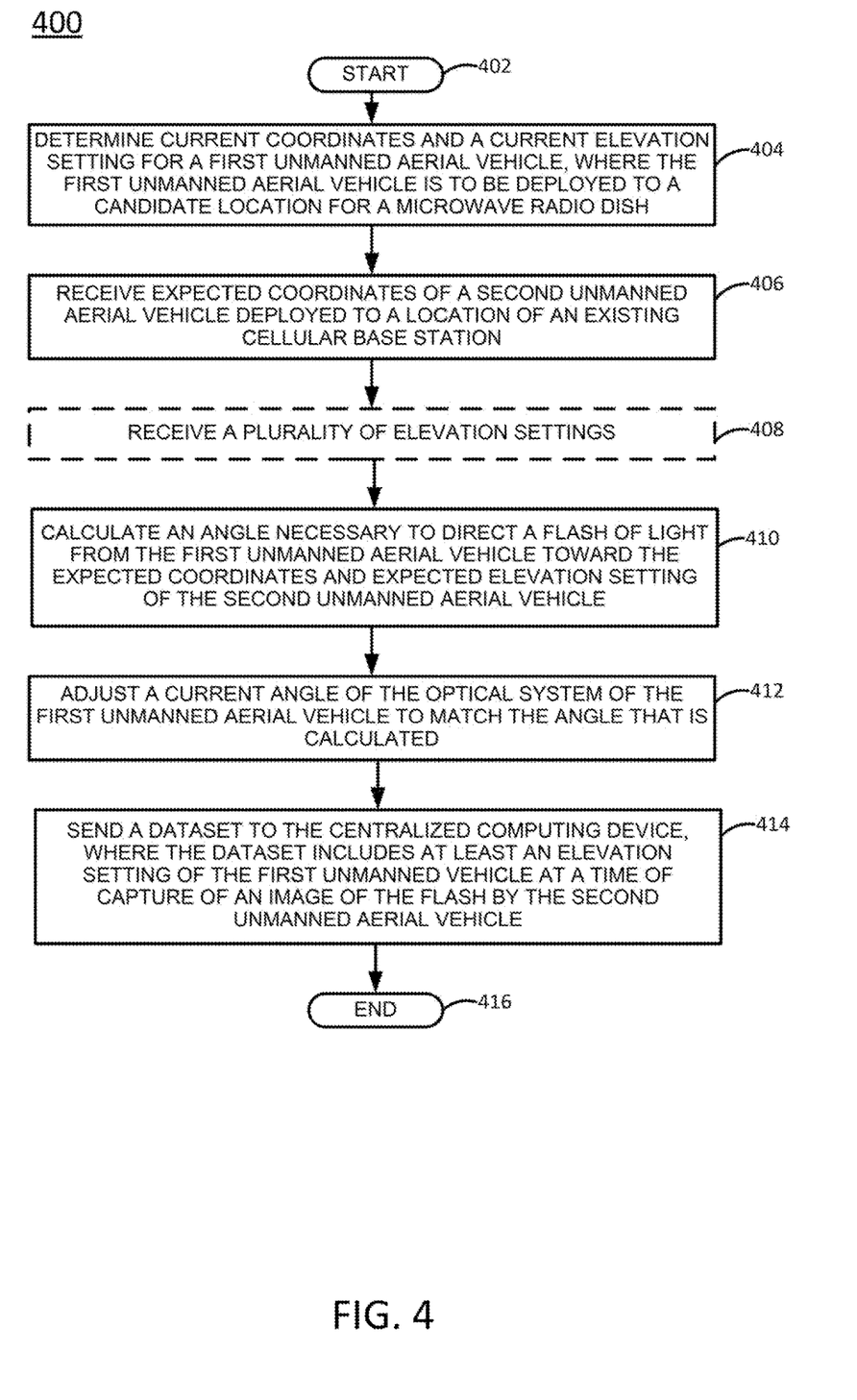
FIG. 4 illustrates a flowchart of an example method for drone-based confirmation of line of sight between two geostationary fixed points, in accordance with the present disclosure.
Figure 5:
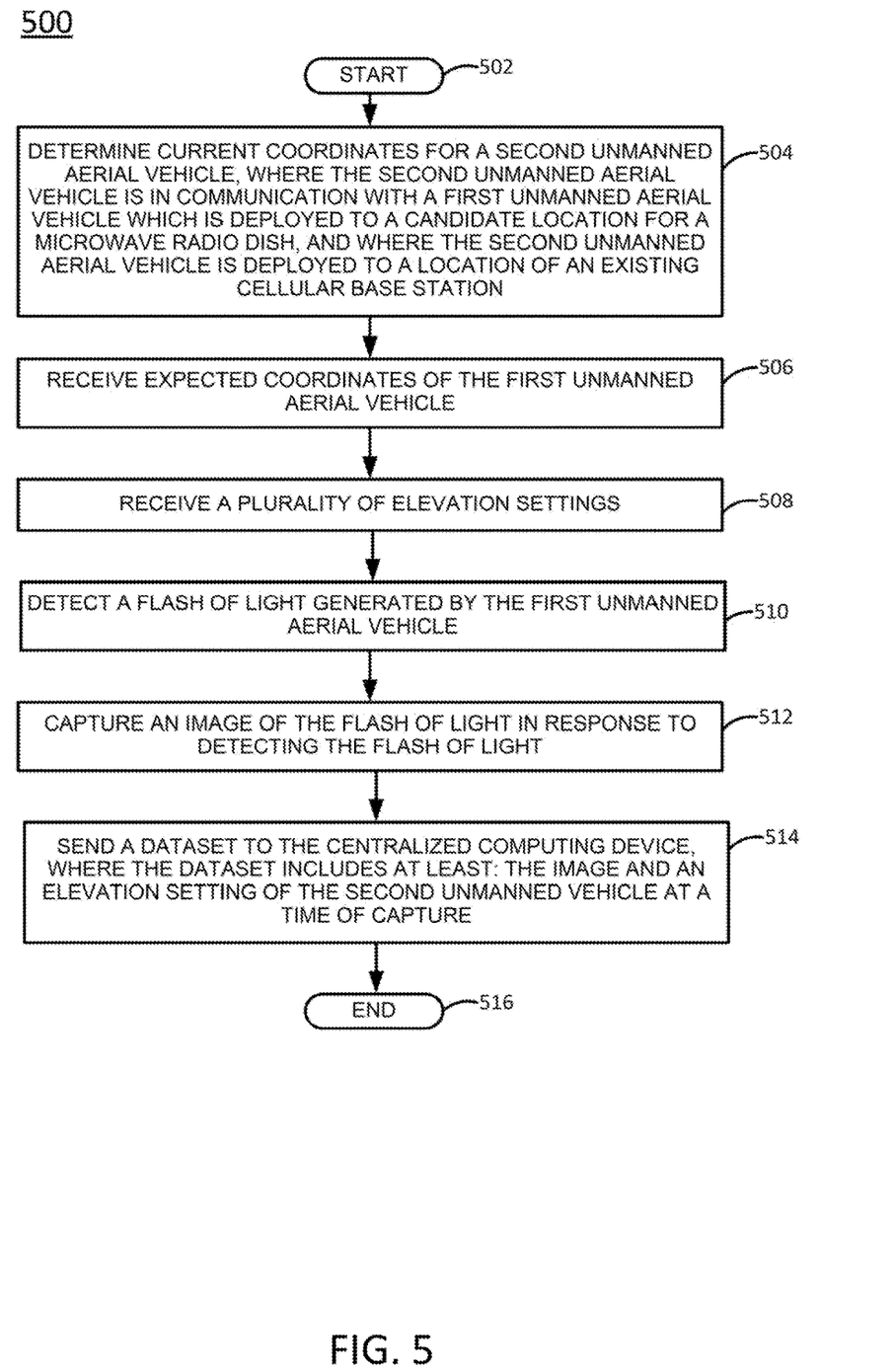
FIG. 5 illustrates a flowchart of an example method for drone-based confirmation of line of sight between two geostationary fixed points, in accordance with the present disclosure.

In one example, access network 122 may include an edge server 108, which may comprise a computing system or server, such as computing system 600 depicted in FIG. 6, and may be configured to provide one or more operations or functions for coordinating a plurality of unmanned aerial vehicles to perform a line of sight survey, as described herein. For instance, example methods 300, 400, and 500 for performing a line of sight survey by coordinating the operations of two unmanned aerial vehicles are illustrated in FIGS. 3, 4, and 5 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components. Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, e.g., a user endpoint device (UE) 116 and unmanned aerial vehicles 114. Access networks 120 and 122 may transmit and receive communications between server 110, user endpoint device 116, application server (AS) 104, unmanned aerial vehicles 114, other components of network 102, devices reachable via the Internet in general, and so forth. In one example, user endpoint device 116 may comprise a mobile device, a cellular smart phone, a wearable computing device (e.g., smart glasses, smart goggles, a virtual reality (VR) headset or other types of head mounted display, or the like), a laptop computer, a tablet computer, or the like (broadly an "XR device"). In one example, user endpoint device 116 may comprise a computing system or device, such as computing system 600 depicted in FIG. 6, and may be configured to provide one or more operations or functions in connection with examples of the present disclosure for coordinating the operations of a plurality of unmanned aerial vehicles to perform a line of sight survey.

In one example, server 110 may comprise a network-based server for coordinating the operations of a plurality of unmanned aerial vehicles to perform a line of sight survey. In this regard, server 110 may comprise the same or similar components as those of AS 104 and may provide the same or similar functions. Thus, any examples described herein with respect to AS 104 may similarly apply to server 110, and vice versa.

In an illustrative example, a system for performing line of sight surveys may be provided via AS 104 and edge server 108. In one example, a human analyst or technician may engage an application on user endpoint device 116 to establish one or more sessions with the system, e.g., a connection to edge server 108 (or a connection to edge server 108 and a connection to AS 104). In addition, the unmanned aerial vehicles 114 may also establish sessions with the system, e.g., connections to the edge server 108 (or connections to the edge server 108 and connections to the AS 104). Additionally, user endpoint device 116 may communicate directly with the unmanned aerial vehicles via the access network 122.

In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between user endpoint device 116, unmanned aerial vehicles 114, and/or edge server 108 may involve cellular communication via one or more base stations (e.g., eNodeBs, gNBs, or the like). However, in another example the communications may alternatively or additionally be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, user endpoint device 116 may communicate with access network 122, network 102, the Internet in general, etc., via a WLAN that interfaces with access network 122.

Figure 2:
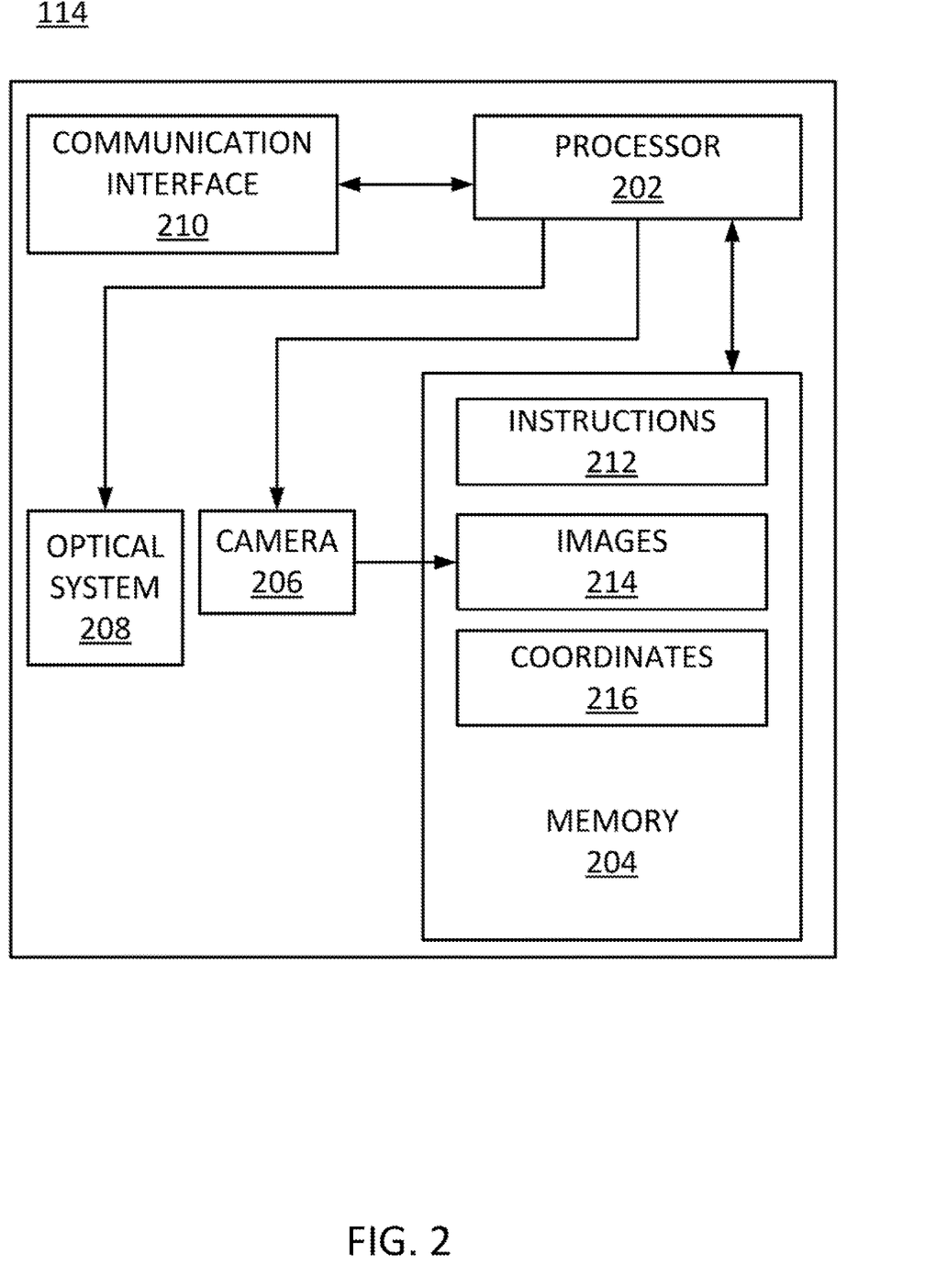
FIG. 2 illustrates an example of the unmanned aerial vehicles of FIG. 1.

FIG. 2 illustrates an example of the unmanned aerial vehicles 114 of FIG. 1. That is, the unmanned aerial vehicle 114 illustrated in FIG. 2 may represent either or both of the first unmanned aerial vehicle $114_1$ or the second unmanned aerial vehicle $114_2$. As illustrated, the unmanned aerial vehicle 114 generally comprises a processor 202, a memory 204, a camera 206, an optical system 208, and a communication interface 210. It will be appreciated that the unmanned aerial vehicle may comprise other components not illustrated in FIG. 2 for the sake of simplicity, including motors, propellers, speakers, microphones, batteries, and other components.

The processor 202 is communicatively coupled to the memory 204, camera 206, optical system 208, and communication interface 210 and may control operations of the memory 204, camera 206, optical system 208, and communication interface 210. In addition, the camera 206 may be communicatively coupled to the memory 204.

In one example, the optical system 208 may comprise a mirror that is mounted to the unmanned aerial vehicle 114 via an adjustable mount that is capable of performing micro rotations and micro pivots (e.g., similar to a gimbal). The mirror in this case may comprise a small quadrilateral (e.g., square) or round mirror. Alternatively or in addition, the optical system 208 may include a laser light source. When a line of sight survey is performed under clear or sunny conditions, the optical system 208 may generate a flash of light by angling the mirror to reflect the light of the sun. However, when conditions may make it more challenging to generate and/or detect flashes of light (e.g., due to heavy clouds, fog, precipitation, or the like), the optical system 208 may generate a flash of light by pulsing the laser light source, such as a class 3B laser emitter. For instance, using a 250 milliwatt laser with a 0.7 degree beam, effective visibility (classified as "identification distance") can be captured in images from approximately twenty miles away. Although examples disclosed herein discuss the use of laser light sources, it will be appreciated that other types of light sources, including non-laser light sources, may be utilized.

The memory 204 may comprise any type of non-transitory computer readable media (e.g., random access memory (RAM) and/or read only memory (ROM)) and may store instructions 212, images 214, and coordinates 216. The instructions 212 may include instructions to perform calculations to determine an angle necessary to generate a flash of light toward another unmanned aerial vehicle and instructions to adjust a position and/or operation of the optical system 208 to generate a flash of light (either light of the sun reflected by a mirror or a pulse of a laser light source) at the calculated angle. The images 214 may include images captured by the camera 206, including images of flashes of light produced by another unmanned aerial vehicle. The coordinates 216 may include coordinates of the unmanned aerial vehicle 114 and/or coordinates of another unmanned aerial vehicle as communicated by a centralized computing device (e.g., user endpoint device 116, AS 104, edge server 108, server 110, or the like). The coordinates 216 may also include coordinates of another unmanned aerial vehicle as communicated directly by the other unmanned aerial vehicle to the unmanned aerial vehicle 114.

The communication interface 210 comprises an interface that allows the unmanned aerial vehicle 114 to connect to a communications network and to communicate with other devices (e.g., the centralized computing device, other unmanned aerial vehicles, etc.) via the communications network. In one example, the communication interface 210 may comprise an LTE or 5G subscriber identity module (SIM) card.

Referring back to FIG. 1, in one example of operation, a first unmanned aerial vehicle $114_1$ may be deployed to a candidate location that is being considered for deployment of a microwave radio dish. Coordinates for the candidate location may be communicated to the first unmanned aerial vehicle $114_1$ from a centralized computing device (which may be operated by a human technician), e.g., user endpoint device 116, edge server 108, AS 104, or server 110. In addition, the centralized computing device may communicate a plurality of elevation settings to the first unmanned aerial vehicle $114_1$. The first unmanned aerial vehicle $114_1$ may confirm its coordinates and elevation using an internal navigation system, such as a global positioning system that is communicatively coupled to a satellite 118 (e.g., as shown by communication link 124).

A second unmanned aerial vehicle $114_2$ may be deployed to a location of an existing cellular base station (from which line of sight is to be evaluated). Coordinates for the location of the existing cellular base station may be communicated to the second unmanned aerial vehicle $114_2$ from the centralized computing device. In addition, the centralized computing device may communicate a second plurality of elevation settings to the second unmanned aerial vehicle $114_2$. The second unmanned aerial vehicle $114_2$ may confirm its coordinates and elevation using an internal navigation system, such as a global positioning system that is communicatively coupled to the satellite 118 (e.g., as shown by communication link 126).

In addition, the centralized computing device may communicate the coordinates for the first unmanned aerial vehicle 114₁ to the second unmanned aerial vehicle 114₂ and the coordinates for the second unmanned aerial vehicle 114₂ to the first unmanned aerial vehicle 114₁. The first unmanned aerial vehicle 114₁ and the second unmanned aerial vehicle 114₂ may also communicate with each other directly in order to exchange coordinates and elevations, for instance using respective SIM cards to establish a direct communication link (e.g., as shown by communication link 128).

Once the first unmanned aerial vehicle 114₁ and the second unmanned aerial vehicle 114₂ have been deployed to their respective locations, a line of sight survey may commence. In one example, the second unmanned aerial vehicle 114₂ may send continuous data regarding the elevation of the second unmanned aerial vehicle 114₂ to the first unmanned aerial vehicle 114₁. The first unmanned aerial vehicle 114₁ may then compute, based on knowledge of the second unmanned aerial vehicle's coordinates and elevation (and on knowledge of the sun's position, if utilizing a mirror to generate a flash), an angle necessary to adjust the first unmanned aerial vehicle's optical system (e.g., to adjust a mirror or a laser light source mounted on the first unmanned aerial vehicle 114₁) in order to generate a flash of light toward the second unmanned aerial vehicle 114₂.

When utilizing the sun 112 to generate the flash of light, the first unmanned aerial vehicle 114₁ may fix itself into a "locked" location (e.g., coordinates and elevation) while tracking the sun's position. The angle(s) calculated by the first unmanned aerial vehicle 114₁ in this case may include an angle of incidence $\alpha$ at which the light of the sun is incident upon the mirror and an angle of reflection $\beta$ at which the light of the sun is reflected off the mirror and toward the second unmanned aerial vehicle 114₂.

Whether utilizing the light of the sun 112 or utilizing a laser light source to generate the flash, the first unmanned aerial vehicle 114₁ and/or the second unmanned aerial vehicle 114₂ may each determine or calculate the following in one example: the type of the light source used to generate the flash (e.g., sun or laser light source), the size of the mirror used to generate the flash (if utilizing the sun as the light source), the included angle $\phi$ between the sun 112 and the second unmanned aerial vehicle 114₂ (if utilizing the sun 112 as the light source; both the first unmanned aerial vehicle 114₁ and the second unmanned aerial vehicle 114₂ may compute the included angle $\phi$), the angle of incidence $\alpha$ and the angle of reflection $\beta$, as discussed above (if utilizing the sun 112 as the light source; these angles may be calculated respectively by both the first unmanned aerial vehicle 114₁ and the second unmanned aerial vehicle 114₂), the amount and direction of the adjustment of the mirror to generate the flash toward the position of the second unmanned aerial vehicle 114₂, and sine, cosine, and tangent calculations for each angle of the triangle that is formed between the first unmanned aerial vehicle 114₁, the second unmanned aerial vehicle 114₂, and the sun 112 (if utilizing the sun 112 as the light source; these calculations may be used to determine the exact angles and alignment criteria).

Detection of the flash of light by the second unmanned aerial vehicle 114₂ will trigger a camera of the second unmanned aerial vehicle 114₂ to capture an image (e.g., a still or video image) of the location of the flash of light. The second unmanned aerial vehicle 114₂ may send the image and the coordinates of the second unmanned aerial vehicle 114₂ at the time of image capture to the centralized computing device. Similarly, the first unmanned aerial vehicle 114₁ may send the coordinates of the first unmanned aerial vehicle 114₁ at the time of image capture to the centralized computing device. Based on the images and coordinates, the centralized computing device may evaluate the suitability of the candidate location for deployment of a microwave radio dish. The operations of the centralized computing device, first unmanned aerial vehicle 114₁ and second unmanned aerial vehicle 114₂ are discussed in further detail with respect to FIGS. 3, 4, and 5, respectively. It will be appreciated that although certain operations are described for the sake of simplicity as being performed by either the first unmanned aerial vehicle 114₁ or the second unmanned aerial vehicle 114₂, the roles of the unmanned aerial vehicles 114 could be reversed. That is, any operations performed by the first unmanned aerial vehicle 114₁ could be performed by the second unmanned aerial vehicle 114₂, and vice versa. In other words, either of unmanned aerial vehicles 114 illustrated in FIG. 1 could generate the flash of light, and either of the unmanned aerial vehicles 114 could capture the image of the flash of light.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

FIG. 3 illustrates a flowchart of an example method 300 for drone-based confirmation of line of sight between two geostationary fixed points, in accordance with the present disclosure. In one example, the method 300 may represent operations that are performed by a centralized computing device (e.g., a server) that collects data from and/or provides instructions and feedback to a plurality of unmanned aerial vehicles. For instance, in one example, steps, functions and/or operations of the method 300 may be performed by a device as illustrated in FIG. 1, e.g., AS 104 or any one or more components thereof. In another example, the steps, functions, or operations of method 300 may be performed by a computing device or system 600, and/or a processing system 602 as described in connection with FIG. 6 below. For instance, the computing device 600 may represent at least a portion of the AS 104 in accordance with the present disclosure. For illustrative purposes, the method 300 is described in greater detail below in connection with an example performed by a processing system in an Internet service provider network, such as processing system 602.

The method 300 begins in step 302 and proceeds to step 304. In step 304, the processing system may assign a first plurality of coordinates and a first plurality of elevation settings to a first unmanned aerial vehicle, where the first unmanned aerial vehicle is to be deployed to a candidate location for a microwave radio dish. In one example, the first unmanned aerial vehicle may comprise a device that is equipped with a camera and that is capable of flight (e.g., an aerial drone). In a further example, the first unmanned aerial vehicle includes an optical system that is capable of generating a flash of light.

In one example, the optical system may include a mirror that is mounted, via a mount, to the unmanned aerial vehicle. The mount may comprise an adjustable mount that is capable of performing micro rotations and micro pivots (e.g., similar to a gimbal). The mirror may comprise a small quadrilateral (e.g., square) or round mirror. In a further example still, the first unmanned aerial vehicle may include an on-board chip that is capable of performing standard reflection analysis trigonometry and geometry to calculate an angle of the mirror that will reflect sunlight toward a second unmanned aerial vehicle (discussed in further detail below). The on-board chip may be further capable of controlling an angle or position of the mirror (e.g., by controlling a motor that rotates or pivots the mount).

Alternatively or in addition, the optical system may include a laser light source to generate pulses of light. The on-board chip may be capable of calculating an angle and direction toward which a pulse of light should be emitted for detection by a second unmanned aerial vehicle. The on-board chip may be further capable of controlling an angle or position of the laser light source to emit the pulse of light in the calculated angle and direction.

Movement of the device may be controlled in an automated manner (e.g., using on-board navigation and vision systems), by remote control (e.g., with assistance from a human operator on the ground), or by a combination of automated systems and remote control. For instance, the first unmanned aerial vehicle may be a drone. In one example, the candidate location for the microwave radio dish comprises a possible location for deployment of a new microwave radio dish (e.g., as selected by a human analyst, potentially in conjunction with feedback from a software application).

In one example, the first plurality of coordinates may comprise two coordinate pairs. A first coordinate pair may comprise coordinates of the first unmanned aerial vehicle's current location (e.g., the candidate location), as confirmed using an onboard navigation (e.g., GPS) system of the first unmanned aerial vehicle. A second coordinate pair may comprise expected (e.g., assigned by the processing system) coordinates of a second unmanned aerial vehicle (for initial course alignment). In one example, the second coordinate pair may correspond to the location of an existing cellular base station. In one example, each coordinate pair of the first coordinate pair and the second coordinate pair may express the respective coordinates in terms of latitude and longitude (although in other examples, other coordinate systems may be used).

In one example, the elevation settings may comprise above ground level (AGL) settings. An unmanned aerial vehicle's AGL refers to the height of the unmanned aerial vehicle above ground (which may be distinguished from the unmanned aerial vehicle's true altitude or elevation, also referred to as "mean sea level," or MSL). In one example, the first plurality of elevation settings comprises at least a first starting elevation setting and a first ending elevation setting. In one example, the first starting elevation setting may be different from the first ending elevation setting. For instance, the first starting elevation setting may be lower than the first ending elevation setting (e.g., 140 feet versus 180 feet).

In one example, assigning the first plurality of coordinates and the first elevation settings may comprise sending the first plurality of coordinates and the first elevation settings to the first unmanned aerial vehicle along with an instruction for the first unmanned aerial vehicle to move to a physical location that corresponds to the first unmanned aerial vehicle's current location and the first starting elevation setting. In another example, at least some of the data of the first plurality of coordinates and the first elevation settings are provided by the first unmanned aerial vehicle to the processing system. For instance, the first unmanned aerial vehicle may measure the first plurality of coordinates and the first elevation settings and send the first plurality of coordinates and the first elevation settings to the processing system. In either case, the processing system may record the first plurality of coordinates and the first elevation settings, e.g., in a database entry for the candidate location for the base station.

In step 306, the processing system may assign a second plurality of coordinates and a second plurality of elevation settings to the second unmanned aerial vehicle that is to be deployed to a location of an existing cellular base station (where the second unmanned aerial vehicle is different and separate from the first unmanned aerial vehicle). Like the first unmanned aerial vehicle, the second unmanned aerial vehicle may comprise a device that is equipped with a camera and that is capable of flight; however, the second unmanned aerial vehicle may or may not omit the optical system. In one example, both the first unmanned aerial vehicle and the second unmanned aerial vehicle include the optical system, so that either of the unmanned aerial vehicles can be deployed to the candidate location. Movement of the device may be controlled in an automated manner, by remote control, or by a combination of automated systems and remote control. For instance, the second unmanned aerial vehicle may be an aerial drone.

In one example, the second plurality of coordinates may comprise two coordinate pairs. A third coordinate pair may comprise coordinates of the second unmanned aerial vehicle's current location, as measured using an onboard navigation (e.g., GPS) system of the second unmanned aerial vehicle. A fourth coordinate pair may comprise expected coordinates of the first unmanned aerial vehicle (for initial course alignment). In one example, each coordinate pair of the third coordinate pair and the fourth coordinate pair may express the respective coordinates in terms of latitude and longitude (although in other examples, other coordinate systems may be used).

In one example, the second plurality of elevation settings may comprise AGL settings for the second unmanned aerial vehicle. In one example, the second plurality of elevation settings comprises at least a second starting elevation setting and a second ending elevation setting. In one example, the second starting elevation setting may be different from the second ending elevation setting. For instance, the second starting elevation setting may be lower than the second ending elevation setting (e.g., 140 feet versus 180 feet). In one example, the second starting elevation setting is equal to the first starting elevation setting, and the second ending elevation setting is equal to the first ending elevation setting. Thus, the first unmanned aerial vehicle and the second unmanned aerial vehicle will in one example start and end the line of sight and mapping operations at the same heights above ground level.

In one example, assigning the second plurality of coordinates and the second elevation settings may comprise sending the second plurality of coordinates and the second elevation settings to the second unmanned aerial vehicle along with an instruction for the second unmanned aerial vehicle to move to a physical location that corresponds to the second unmanned aerial vehicle's current location and the second starting elevation setting. In another example, at least some of the data of the second plurality of coordinates and the second elevation settings are provided by the second unmanned aerial vehicle to the processing system. For instance, the second unmanned aerial vehicle may measure the second plurality of coordinates and the second elevation settings and send the second plurality of coordinates and the second elevation settings to the processing system. In either case, the processing system may record the second plurality of coordinates and the second elevation settings, e.g., in a database entry for the candidate location for the base station.

In step 308, the processing system may receive a dataset from at least one of: the first unmanned aerial vehicle and the second unmanned aerial vehicle, where the dataset includes at least: an image of a flash (where the flash may be caused by sunlight reflecting off of the mirror mounted to the first unmanned aerial vehicle or by a pulse of a laser light source mounted to the first unmanned aerial vehicle, and the image is captured by a camera of the second unmanned aerial vehicle), an elevation setting of the first unmanned vehicle at a time of capture of the image, and an elevation setting of the second unmanned vehicle at a time of capture of the image. In one example, the second unmanned aerial vehicle may send the image, while the first unmanned aerial vehicle and the second unmanned aerial vehicle may send their respective elevation settings.

In one example, the image may comprise a still image or a video image. Whether still or video, the image may be transmitted to the processing system in real time (i.e., as the image is captured, for instance as a live video feed). In one example, a plurality of (still or video) images of the flash may be captured and sent to the processing system, where each image of the plurality of images is captured at a different elevation (e.g., different elevation settings for first unmanned aerial vehicle and the second unmanned aerial vehicle). For instance, after each image is captured, the first unmanned aerial vehicle and the second unmanned aerial vehicle may each ascend ten feet, and another image may be captured and transmitted to the processing system.

In step 310, the processing system may determine, based on an analysis of the dataset, whether a line of sight between the first unmanned aerial vehicle and the second unmanned aerial vehicle is sufficient for deployment of the microwave radio dish. Sufficiency of the line of sight may not require that the line of sight be completely unobstructed, but may require that an expected strength of a signal conveyed along the line of sight will meet at least a predefined threshold.

The method 300 may end in step 312.

In one example, the method 300 may be repeated for a plurality of candidate locations, and a selection of one of the candidate locations from among the plurality of candidate locations may be made in conjunction with analysis of similar datasets that represent a plurality of other (different) candidate locations for the microwave radio dish. Thus, the processing system may select a best option from among a plurality of candidate locations.

FIG. 4 illustrates a flowchart of an example method 400 for drone-based confirmation of line of sight between two geostationary fixed points, in accordance with the present disclosure. In one example, the method 400 may represent operations that are performed by an unmanned aerial vehicle that includes an optical system (e.g., an adjustable mirror or a laser light source), where the unmanned aerial vehicle reports data to and/or receives instructions and feedback from a centralized computing device. For instance, in one example, steps, functions and/or operations of the method 400 may be performed by a device as illustrated in FIG. 1, e.g., unmanned aerial vehicles 114 or any one or more components thereof. In another example, the steps, functions, or operations of method 400 may be performed by a computing device or system 600, and/or a processing system 602 as described in connection with FIG. 6 below. For instance, the computing device 600 may represent at least a portion of the unmanned aerial vehicle 114 of FIG. 1 or FIG. 2 in accordance with the present disclosure. For illustrative purposes, the method 400 is described in greater detail below in connection with an example performed by a processing system in an Internet service provider network, such as processing system 602.

The method 400 begins in step 402 and proceeds to step 404. In step 404, the processing system of a first unmanned aerial vehicle may determine current coordinates for the first unmanned aerial vehicle, where the first unmanned aerial vehicle is to be deployed to a candidate location for a microwave radio dish. In one example, the first unmanned aerial vehicle may comprise a device that is equipped with a camera and that is capable of flight (e.g., an aerial drone). In a further example, the first unmanned aerial vehicle includes an optical system that is capable of generating a flash of light. In one example, the optical system may comprise an adjustable mirror that is mounted, via a mount, to the unmanned aerial vehicle. The mount may comprise an electrically driven adjustable mount that is capable of performing micro rotations and micro pivots (e.g., similar to a gimbal). The mirror may comprise a small quadrilateral (e.g., square) or round mirror. An on-board chip may be capable of controlling an angle or position of the mirror (e.g., by controlling a motor that rotates or pivots the mount). In another example, the optical system may comprise a laser light source, and an on-board chip may control and angle or position of the laser light source.

The first unmanned aerial vehicle may include an on-board navigation system (e.g., a GPS system) that is capable of measuring the current coordinates of the first unmanned aerial vehicle and optionally determining the current position of the sun relative to the current coordinates of the first unmanned aerial vehicle (if using a mirror to generate a flash of light, as discussed in further detail below). In one example, the current coordinates of the first unmanned aerial vehicle may express the location of the first unmanned aerial vehicle in terms of latitude and longitude (although in other examples, other coordinate systems may be used). In one example, the current coordinates of the first unmanned aerial vehicle may comprise coordinates that a centralized computing device has instructed the first unmanned aerial vehicle to go to (e.g., coordinates of the candidate location for the microwave radio dish). In one example, if the current position of the sun is determined by the on-board navigation system, then the processing system may "fix" the first unmanned aerial vehicle in a locked location while tracking the sun.

In step 406, the processing system may receive (e.g., from a centralized computing device or from the second unmanned aerial vehicle) expected coordinates of the second unmanned aerial vehicle that is deployed to a location of an existing cellular base station (for initial course alignment). For instance, in one example, the second unmanned aerial vehicle may measure its own current coordinates (e.g., using an on-board navigation system of the second unmanned aerial vehicle) and report the measured coordinates to a centralized computing device and/or directly to the first unmanned aerial vehicle. In another example, the expected coordinates of the second unmanned aerial vehicle may comprise coordinates that a centralized computing device has instructed the second unmanned aerial vehicle to go to. In one example, the expected coordinates of the second unmanned aerial vehicle may express the location of the second unmanned aerial vehicle in terms of latitude and longitude (although in other examples, other coordinate systems may be used).

In optional step 408 (illustrated in phantom), the processing system may receive (e.g., from a centralized computing device) a plurality of elevation settings. In one example, the plurality of elevation settings may comprise AGL settings. In one example, the plurality of elevation settings comprises at least a starting elevation setting and an ending elevation setting. In one example, the starting elevation setting may be different from the ending elevation setting. For instance, the starting elevation setting may be lower than the ending elevation setting (e.g., 140 feet versus 180 feet). In one example, the plurality of elevation settings may include an instruction for the first unmanned aerial vehicle to move to a physical location that corresponds to the first unmanned aerial vehicle's current location and the starting elevation setting.

In step 410, the processing system may calculate an angle necessary to direct a flash of light from the first unmanned aerial vehicle toward the expected coordinates and expected elevation setting of the second unmanned aerial vehicle (e.g., by reflecting sunlight from a mirror of the first unmanned aerial vehicle toward the expected coordinates of the second unmanned aerial vehicle or by pulsing a laser light source of the first unmanned aerial vehicle toward the expected coordinates of the second unmanned aerial vehicle). For instance, where the first unmanned aerial vehicle's optical system comprises an adjustable mirror, the first unmanned aerial vehicle may include a sun tracking feature (such as the type of feature used by solar engineers, astronomers, and other solar-related industries) which may help the processing system to track the position of the sun relative to the first unmanned aerial vehicle. In one example, the calculation may be performed using standard reflection analysis trigonometry and geometry to calculate the angle of incidence from the sun and the angle of reflection in relation to the expected coordinates of the second unmanned aerial vehicle.

In step 412, the processing system may adjust a current angle of the optical system of the first unmanned aerial vehicle to match the angle that is calculated in step 410. In one example, the adjusting may comprise sending an instruction to a motor which controls movement of a mount that attaches the mirror to the first unmanned aerial vehicle. In one example, the mount may be capable of performing micro rotations and micro pivots, similar to a gimbal.

In step 414, the processing system may send a dataset to the centralized computing device, where the dataset includes at least an elevation setting of the first unmanned vehicle at a time of capture of the image. In one example, the dataset may also include the coordinates (e.g., latitude and longitude or other coordinates) of the first unmanned aerial vehicle at the time of image capture. In one example, the processing system may send the dataset in response to a signal from the second unmanned aerial vehicle indicating that the second unmanned aerial vehicle has captured an image. In another example, the processing system may send data continuously to the centralized computing device. For instance, the processing system may stream the location of the first unmanned aerial vehicle to the centralized computing device or may stream video captured by a camera of the first unmanned aerial vehicle, where the video metadata indicates a location of the first unmanned aerial vehicle at the time of each frame capture.

In one example, the first unmanned aerial vehicle and the second unmanned aerial vehicle may cooperate to capture and send a plurality of images, where each image of the plurality of images is captured at a different elevation (e.g., different elevation settings for the first unmanned aerial vehicle and the second unmanned aerial vehicle). For instance, after each image is captured, the first unmanned aerial vehicle and the second unmanned aerial vehicle may each ascend ten feet, and another image may be captured and transmitted to the centralized computing device. Thus, by working together, the first unmanned aerial vehicle and the second unmanned aerial vehicle may be able to collect data that can be used to assess the line of site for a microwave radio dish at a plurality of different elevations at the candidate location.

The method 400 may end in step 416.

FIG. 5 illustrates a flowchart of an example method 500 for drone-based confirmation of line of sight between two geostationary fixed points, in accordance with the present disclosure. In one example, the method 500 may represent operations that are performed by an unmanned aerial vehicle that captures images and reports data (e.g., including the images) to and/or receives instructions and feedback from a centralized computing device. For instance, in one example, steps, functions and/or operations of the method 500 may be performed by a device as illustrated in FIG. 1, e.g., unmanned aerial vehicles 114 or any one or more components thereof. In another example, the steps, functions, or operations of method 500 may be performed by a computing device or system 600, and/or a processing system 602 as described in connection with FIG. 6 below. For instance, the computing device 600 may represent at least a portion of the unmanned aerial vehicle 114 of FIG. 1 or FIG. 2 in accordance with the present disclosure. For illustrative purposes, the method 500 is described in greater detail below in connection with an example performed by a processing system in an Internet service provider network, such as processing system 602.

The method 500 begins in step 502 and proceeds to step 504. In step 504, the processing system of a second unmanned aerial vehicle may determine current coordinates for the second unmanned aerial vehicle, where the second unmanned aerial vehicle is in communication with a first unmanned aerial vehicle which is deployed to a candidate location for a microwave radio dish, and where the second unmanned aerial vehicle is deployed to a location of an existing cellular base station. In one example, the second unmanned aerial vehicle may comprise a device that is equipped with a camera and that is capable of flight (e.g., an aerial drone). In a further example, the second unmanned aerial vehicle may also include an optical system that is capable of generating a flash and/or capturing an image of a flash of light. In one example, the optical system may comprise a mirror mounted on a gimbal-like mount, as discussed above. In another example, the optical system may comprise a laser light source.

The second unmanned aerial vehicle may include an on-board navigation system (e.g., a GPS system) that is capable of measuring the current coordinates of the second unmanned aerial vehicle. In one example, the current coordinates of the second unmanned aerial vehicle may express the location of the second unmanned aerial vehicle in terms of latitude and longitude (although in other examples, other coordinate systems may be used). In one example, the current coordinates of the second unmanned aerial vehicle may comprise coordinates that a centralized computing device has instructed the second unmanned aerial vehicle to go to.

In step 506, the processing system may receive (e.g., from a centralized computing device or from the first unmanned aerial vehicle) expected coordinates of the first unmanned aerial vehicle (for initial course alignment). For instance, in one example, the first unmanned aerial vehicle may measure its own current coordinates (e.g., using an on-board navigation system of the first unmanned aerial vehicle) and report the measured coordinates to a centralized computing device and/or to the second unmanned aerial vehicle. In another example, the expected coordinates of the first unmanned aerial vehicle may comprise coordinates that a centralized computing device has instructed the first unmanned aerial vehicle to go to (e.g., a candidate location for a microwave radio dish). In one example, the expected coordinates of the first unmanned aerial vehicle may express the location of the first unmanned aerial vehicle in terms of latitude and longitude (although in other examples, other coordinate systems may be used).

In step 508, the processing system may receive (e.g., from a centralized computing device) a plurality of elevation settings. In one example, the plurality of elevation settings comprise AGL settings. In one example, the plurality of elevation settings comprises at least a starting elevation setting and an ending elevation setting. In one example, the starting elevation setting may be different from the ending elevation setting. For instance, the starting elevation setting may be lower than the ending elevation setting (e.g., 140 feet versus 180 feet). In one example, the plurality of elevation settings may include an instruction for the second unmanned aerial vehicle to move to a physical location that corresponds to the second unmanned aerial vehicle's current location and the starting elevation setting.

In step 510, the processing system may detect a flash of light generated by the first unmanned aerial vehicle (e.g., reflected off of a mirror on the first unmanned aerial vehicle or emitted by a laser light source of the first unmanned aerial vehicle). For instance, an optical light sensor of the second unmanned aerial vehicle may be configured to detect the flash of light.

In step 512, the processing system capture an image of the flash of light in response to detecting the flash of light. In one example, the captured image may comprise a still image, a video image, or both still and video images. For example, the detection of the flash of light can be correlated to one or more frames of a video captured in step 512.

In step 514, the processing system may send a dataset to the centralized computing device, where the dataset includes at least: the image and an elevation setting of the second unmanned vehicle at a time of capture of the image. In one example, the dataset may also include the coordinates (e.g., latitude and longitude or other coordinates) of the second unmanned aerial vehicle at the time of image capture. In one example, the processing system may send the dataset automatically upon capture of the image. In another example, the processing system may capture several images from different coordinates and/or elevation settings before sending all of the images to the centralized computing device in a single dataset. In another example, the processing system may send data continuously to the centralized computing device. For instance, the processing system may stream the location of the second unmanned aerial vehicle to the centralized computing device or may stream video captured by a camera of the second unmanned aerial vehicle, where the video metadata indicates a location of the second unmanned aerial vehicle at the time of each frame capture.

In one example, a plurality of (still or video) images of the flash may be captured and sent to the processing system, where each image of the plurality of images is captured at a different elevation (e.g., different elevation settings for the first unmanned aerial vehicle and the second unmanned aerial vehicle). For instance, after each image is captured, the first unmanned aerial vehicle and the second unmanned aerial vehicle may each ascend ten feet, and another image may be captured and transmitted to the processing system. Thus, by working together, the first unmanned aerial vehicle and the second unmanned aerial vehicle may be able to collect data that can be used to assess the line of site for a microwave radio dish at a plurality of different elevations at the candidate location.

The method 500 may end in step 516.

Examples of the present disclosure may therefore allow line of sight analysis to be performed precisely and efficiently using two unmanned aerial vehicles, where one of the unmanned aerial vehicles is deployed to a candidate location for the microwave radio dish and the other unmanned aerial vehicle is deployed to the location of an existing cellular base station. The two unmanned aerial vehicles thus serve as fixed geostationary points for the line of sight analysis. Use of unmanned aerial vehicles may reduce the costs of even a single line of sight survey by thousands of dollars without loss of accuracy.

Previously, the locations and elevations at which to deploy microwave radio dishes would be manually calculated, and human technicians would then climb the cellular base stations and/or microwave radio dish towers to confirm the calculations by manually generating flashes of light. As discussed above, this process is costly, particularly at scale, and may be prone to miscalculations.

Although examples of the present disclosure are discussed within the context of line of sight surveys for microwave radio dishes, it will be appreciated that the examples disclosed herein may provide similar advantages for other applications where line of sight between two points requires confirmation. For instance, examples of the present disclosure could be implemented to enhance military targeting systems (e.g., by using a constant light source to "heat" an area), control spot fires for fire crews (e.g., by using a constant light source with a large enough reflective surface to start a backfire or spot fire without placing individuals in harm's way), assist search and rescue personnel (e.g., by providing lost hikers, campers, drivers, marine operators, or the like to utilize a standard platform to generate a distress signal/strobe that can be detected by a compatible device within range and guide the compatible device to their location), and to improve other applications.

In one example, each of the two unmanned aerial vehicles may each be equipped with a cellular network (e.g., LTE or 5G) SIM card that allows the two unmanned aerial vehicles to communicate with each other as well as with the centralized computing device. Thus, the two unmanned aerial vehicles may be able to communicate their respective coordinates and elevations (e.g., AGL settings) directly to each other at any time during the line of sight analysis. Sharing this data allows the unmanned aerial vehicle that is deployed to the candidate location to properly adjust the settings of the optical system to generate the flash at an angle that can be detected by the other unmanned aerial vehicle. The cellular connectivity will also allow a human analyst at the centralized computing device to view images from the unmanned aerial vehicles in real time.

It should be noted that the methods 300, 400, and 500 may be expanded to include additional steps or may be modified to include additional operations with respect to the steps outlined above. In addition, although not specifically specified, one or more steps, functions, or operations of the methods 300, 400, and 500 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIGS. 3, 4, and 5 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 6 depicts a high-level block diagram of a computing device or processing system specifically programmed to perform the functions described herein. As depicted in FIG. 6, the processing system 600 comprises one or more hardware processor elements 602 (e.g., a central processing unit (CPU), a microprocessor, or a multi-core processor), a memory 604 (e.g., random access memory (RAM) and/or read only memory (ROM)), a module 605 for confirming line of sight using a plurality of unmanned aerial vehicles, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the methods 300, 400, or 500 as discussed above are implemented in a distributed or parallel manner for a particular illustrative example, i.e., the steps of the above methods 300, 400, or 500 or the entire methods 300, 400, or 500 are implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 602 can also be configured or programmed to cause other devices to perform one or more operations as discussed above. In other words, the hardware processor 602 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed methods 300, 400, or 500. In one example, instructions and data for the present module or process 605 for confirming line of sight using a plurality of unmanned aerial vehicles (e.g., a software program comprising computer-executable instructions) can be loaded into memory 604 and executed by hardware processor element 602 to implement the steps, functions, or operations as discussed above in connection with the illustrative methods 300, 400, or 500. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 605 for confirming line of sight using a plurality of unmanned aerial vehicles (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:
1. A method comprising:
  determining, by a processing system of a first unmanned aerial vehicle including at least one processor, current coordinates and a current elevation setting of the first unmanned aerial vehicle, where the first unmanned aerial vehicle is to be deployed to a candidate location for a microwave radio dish;

receiving, by the processing system, expected coordinates and an expected elevation setting of a second unmanned aerial vehicle that is deployed to a location of an existing cellular base station;

calculating, by the processing system, an angle necessary to direct a flash of light from the first unmanned aerial vehicle toward the expected coordinates and expected elevation setting of the second unmanned aerial vehicle;

adjusting, by the processing system, a current angle of an optical system of the first unmanned aerial vehicle to match the angle that is calculated;

controlling, by the processing system, the optical system to generate the flash of light once the current angle of the optical system matches the angle that is calculated, wherein the flash of light serves as a trigger that causes the second unmanned aerial vehicle to capture an image of the flash of light; and sending, by the processing system in response to a signal from the second unmanned aerial vehicle that the second unmanned aerial vehicle has captured the image of the flash of light, a dataset to a centralized computing device, wherein the dataset includes at least an elevation setting of the first unmanned aerial vehicle at a time of capture of the image of the flash of light by the second unmanned aerial vehicle.

2. The method of claim 1, wherein each of the current elevation setting of the first unmanned aerial vehicle and the expected elevation setting of the second unmanned aerial vehicle comprises an above ground level setting.

3. The method of claim 1, further comprising:
receiving, by the processing system, a plurality of elevation settings from the centralized computing device.

4. The method of claim 3, wherein the plurality of elevation settings includes a starting elevation setting and an ending elevation setting that is different from the starting elevation setting.

5. The method of claim 4, wherein the starting elevation setting is lower than the ending elevation setting.

6. The method of claim 5, wherein the plurality of elevation settings includes pairs of elevation settings, wherein each pair of the pairs of elevation settings includes an elevation setting for the first unmanned aerial vehicle and a corresponding elevation setting for the second unmanned aerial vehicle.

7. The method of claim 6, wherein the corresponding elevation setting for the second unmanned aerial vehicle is equal to the elevation setting for the first unmanned aerial vehicle.

8. The method of claim 5, wherein the starting elevation comprises an elevation at which the processing system is expected to perform a first iteration of the determining, the receiving, the calculating, the adjusting, and the sending, and the ending elevation setting comprises an elevation at which the processing system is expected to perform a final iteration of the determining, the receiving, the calculating, the adjusting, and the sending.

9. The method of claim 8, wherein the plurality of elevation settings includes at least one elevation setting that is between the starting elevation setting and the ending elevation setting, and the processing system is expected to perform at least one additional iteration of the determining, the receiving, the calculating, the adjusting, and the sending at the at least one elevation setting.

10. The method of claim 1, wherein the image is a still image.

11. The method of claim 1, wherein the image is a video image.

12. The method of claim 1, wherein the flash of light is generated by a mirror mounted to the first unmanned aerial vehicle.

13. The method of claim 12, wherein an angle at which to position the mirror to reflect sunlight toward the second unmanned aerial vehicle to generate the flash of light is calculated by an on-board chip of the first unmanned aerial vehicle based on knowledge of a sun position and knowledge of a position of the second unmanned aerial vehicle.

14. The method of claim 13, wherein the position of the second unmanned aerial vehicle is transmitted in a plurality of coordinates sent by the centralized computing device to the processing system.

15. The method of claim 13, wherein the position of the second unmanned aerial vehicle is transmitted directly by the second unmanned aerial vehicle to the processing system.

16. The method of claim 15, wherein the first unmanned aerial vehicle and the second unmanned aerial vehicle communicate with each other over a cellular communications network.

17. The method of claim 12, wherein a mount that couples the mirror to the first unmanned aerial vehicle performs rotations and pivots.

18. The method of claim 1, wherein the flash of light is generated by a light source mounted to the first unmanned aerial vehicle.

19. A non-transitory computer-readable medium storing instructions which, when executed by a processing system of a first unmanned aerial vehicle including at least one processor, cause the processing system to perform operations, the operations comprising:

determining current coordinates and a current elevation setting of the first unmanned aerial vehicle, where the first unmanned aerial vehicle is to be deployed to a candidate location for a microwave radio dish;

receiving expected coordinates and an expected elevation setting of a second unmanned aerial vehicle that is deployed to a location of an existing cellular base station;

calculating an angle necessary to direct a flash of light from the first unmanned aerial vehicle toward the expected coordinates and expected elevation setting of the second unmanned aerial vehicle;

adjusting a current angle of an optical system of the first unmanned aerial vehicle to match the angle that is calculated;

controlling the optical system to generate the flash of light once the current angle of the optical system matches the angle that is calculated, wherein the flash of light serves as a trigger that causes the second unmanned aerial vehicle to capture an image of the flash of light; and sending, in response to a signal from the second unmanned aerial vehicle that the second unmanned aerial vehicle has captured the image of the flash of light, a dataset to a centralized computing device, wherein the dataset includes at least an elevation setting of the first unmanned aerial vehicle at a time of capture of the image of the flash of light by the second unmanned aerial vehicle.

20. A first unmanned aerial vehicle comprising:
a processing system including at least one processor; and a non-transitory computer-readable medium storing instructions which, when executed by the processing system, cause the processing system to perform operations, the operations comprising:

determining current coordinates and a current elevation setting of the first unmanned aerial vehicle, where the first unmanned aerial vehicle is to be deployed to a candidate location for a microwave radio dish;

receiving expected coordinates and an expected elevation setting of a second unmanned aerial vehicle that is deployed to a location of an existing cellular base station;

calculating an angle necessary to direct a flash of light from the first unmanned aerial vehicle toward the expected coordinates and expected elevation setting of the second unmanned aerial vehicle;

adjusting a current angle of an optical system of the first unmanned aerial vehicle to match the angle that is calculated;

controlling the optical system to generate the flash of light once the current angle of the optical system matches the angle that is calculated, wherein the flash of light serves as a trigger that causes the second unmanned aerial vehicle to capture an image of the flash of light; and sending, in response to a signal from the second unmanned aerial vehicle that the second unmanned aerial vehicle has captured the image of the flash of light, a dataset to a centralized computing device, wherein the dataset includes at least an elevation setting of the first unmanned aerial vehicle at a time of capture of the image of the flash of light by the second unmanned aerial vehicle.

* * * * *